W. H. CONVER.
CHURN
No. 175,429. Patented March 28, 1876.
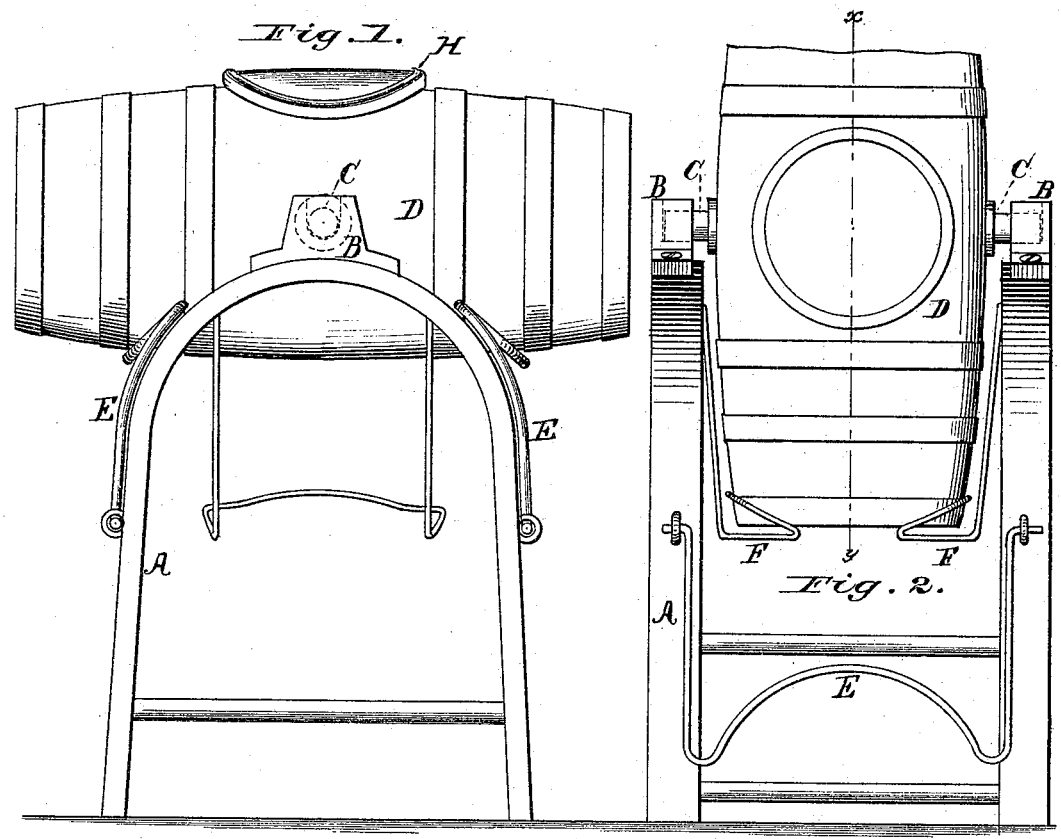
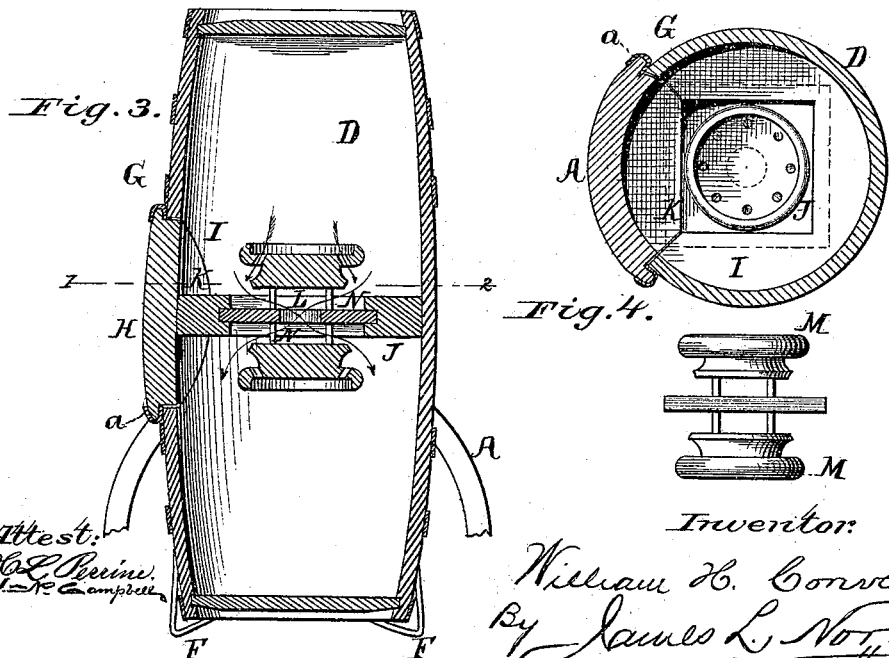
Attest:
H. L. Perine
J. R. Campbell
Inventor:
William H. Conver
By James L. Norris atty.

UNITED STATES PATENT OFFICE.

WILLIAM H. CONVER, OF AGNEW'S MILLS, ASSIGNOR OF ONE-FOURTH HIS RIGHT TO JOHN GOTHART, OF PITTSBURG, PENNSYLVANIA.

IMPROVEMENT IN CHURNS.

Specification forming part of Letters Patent No. 175,429, dated March 28, 1876; application filed March 20, 1876.

*To all whom it may concern:*

Be it known that I, WILLIAM H. CONVER, of Agnew's Mills, in the county of Venango and State of Pennsylvania, have invented certain new and useful Improvements in Churns, of which the following is a specification:

This invention consists, essentially, in the use of a churn-barrel, which is divided into two compartments by a central fixed partition and a movable partition-plate, having a perforated cup-shaped disk on each side, which disks are held above the movable partition-plate so as to enable the milk to pass through an opening in the same from one compartment into the other. The action of the churn is such that when the churn-barrel is in an erect position the milk will flow from the upper compartment into the lower one, and, in doing so, it will encounter an upward current of air, caused by the displacement of the air in the lower chamber by the entering milk, which current of air is spread so as to pass through the milk and cause the separation of the oily globules contained in the milk. The cup-shaped disk on the movable partition-plate serves to catch the greater portion of the butter, and they are provided with small openings for the purpose of draining the buttermilk from the butter-crumbs.

The invention also consists in the combination, with a churn-barrel hung on trunnions in a supporting-frame, of pivoted frames or bent rods for supporting the churn-barrel in a horizontal position.

The invention further consists in the combination, with the swinging churn-barrel, of spring-holders for retaining the churn-barrel in an erect position during the churning operation.

In the accompanying drawings, Figure 1 is a side elevation, showing the churn-barrel in a horizontal position. Fig. 2 is a front elevation, showing the churn in the working position. Fig. 3 is a vertical sectional view, representing the internal construction of the churn. Fig. 4 is a detail view, illustrating the removable partition-plate, with its cup-shaped disks.

In the drawing, letter A denotes a vertical frame composed of side standards and horizontal connecting rounds or bars. To the upper ends of the side standards of the frame are secured boxes B, which are adapted for the reception of gudgeons or trunnions C on the sides of the churn-barrel D. The churn-barrel may be of any desired form, such as square, rectangular, &c.; but it is, preferably, made long and cylindrical. It is capable of being turned or revolved, and can be retained in a horizontal position, when introducing the milk or removing the butter, by means of bail-shaped frames or bent rods E, which are pivoted to the end standards of the frame, so as to be turned into a vertical position for supporting the churn-barrel, as shown in Fig. 1. The swinging bails or frames E are shaped to conform to the contour of the churn-barrel, and when not in use they are turned down against the frame, as seen in Fig. 2. The churn-barrel is retained in a vertical position by means of spring-holders F, which are located at each side of the frame for receiving the lower end of the churn-barrel between the same. The spring-holders are formed of wire rods, and consist of two vertical side branches and a horizontal connecting portion curved to conform to the shape of the churn-barrel. The churn-barrel is provided with a large opening, G, in the center of one of its sides, which opening is closed by means of a detachable lid or cover, H. An india-rubber or elastic gasket, a, applied around the edge of the cover, serves to pack the joint between it and the churn-barrel, so as to render the latter perfectly air-tight. The cover may be secured by means of a hasp and staple, fastening bar, or other suitable fastening device. Inside of the barrel there is centrally located a partition, I, which is provided with grooves for the reception of a detachable plate or board, J, forming the removable center portion of the partition. The partition, the removable board, and a grooved and beveled block or strip, K, on the inside of the cover, serve to divide the churn-barrel into two compartments, the only communication between which is through an opening, L, (one or more in number,) in the removable partition plate or board. To each side of said removable board is attached a cup-shaped disk, M, which is held above the board by means of pins N.

The operation of churning, or the separation of the oily globules from the milk, is effected by turning the churn-barrel in an erect position, when the milk will be caused to run into the lower compartment, leaving the upper one filled with air. By reversing the churn-barrel the compartment filled with milk is brought on the top, and the milk immediately commences to run into the lower chamber through the opening in the removable partition-board. As the milk descends an ascending current of air passes through the same, in order to cause the agitation of the milk, and, consequently, the separation of the oily globules contained in the same. By repeatedly reversing the churn-barrel the churning operation is performed, and a complete separation of the globules which make the butter is effected.

The cup-shaped disks on the removable partition plate or board serve to collect the greater portion of the butter globules, and they are also perforated for the purpose of draining the buttermilk from the butter-crumbs. The cup-shaped disks serve, in addition to their function of collecting the butter, to intercept the air-currents for the purpose of spreading or diffusing the same, in order to cause a more thorough action upon the milk.

What I claim, and desire to secure by Letters Patent, is—

1. The combination of disks with a partition-board of a reversible compartment-churn, for collecting the butter globules and spreading the air, substantially as herein set forth.

2. The combination of swinging bails or frames with a reversible churn-barrel and a supporting-frame, as and for the purpose set forth.

3. The combination of spring-holders with a reversible or journaled churn-barrel and a supporting-frame, as and for the purpose set forth.

4. The combination of the frame A, having journal-boxes B, swinging bails E, and spring-holders F, to operate in connection with a reversible or journaled churn-barrel, D, as and for the purpose set forth.

In testimony that I claim the foregoing I have hereunto set my hand in the presence of the subscribing witnesses.

WILLIAM H. CONVER.

Witnesses:
    JOS. L. COOMBS,
    JAMES L. NORRIS.